(12) United States Patent
Ishida et al.

(10) Patent No.: US 8,653,708 B2
(45) Date of Patent: Feb. 18, 2014

(54) STATOR

(75) Inventors: Kenji Ishida, Nagoya (JP); Eiji Yamada, Owariasahi (JP)

(73) Assignees: Aisin Seiki Kabushiki Kaisha, Kariya (JP); Toyota Jidosha Kabushiki Kaisha, Toyota (JP)

( * ) Notice: Subject to any disclaimer, the term of this patent is extended or adjusted under 35 U.S.C. 154(b) by 246 days.

(21) Appl. No.: 13/318,961

(22) PCT Filed: Jun. 8, 2010

(86) PCT No.: PCT/JP2010/059677
§ 371 (c)(1),
(2), (4) Date: Nov. 4, 2011

(87) PCT Pub. No.: WO2010/147027
PCT Pub. Date: Dec. 23, 2010

(65) Prior Publication Data
US 2012/0086292 A1     Apr. 12, 2012

(30) Foreign Application Priority Data
Jun. 17, 2009   (JP) ................ 2009-144413

(51) Int. Cl.
*H02K 11/00*     (2006.01)
(52) U.S. Cl.
USPC .......................................... 310/68 C; 310/71
(58) Field of Classification Search
USPC ................... 310/68 C, 71, 179, 260
See application file for complete search history.

(56) References Cited

U.S. PATENT DOCUMENTS

| 4,571,518 | A | * | 2/1986 | Kintz et al. | 310/68 R |
| 5,907,204 | A | * | 5/1999 | Matsushima et al. | 310/68 C |
| 6,153,954 | A | * | 11/2000 | Uchida et al. | 310/68 C |
| 7,531,926 | B2 | * | 5/2009 | Jones | 310/89 |
| 7,535,136 | B2 | * | 5/2009 | Rush et al. | 310/68 C |
| 7,815,368 | B2 | * | 10/2010 | Sasaki et al. | 374/152 |
| 8,258,660 | B2 | * | 9/2012 | Strobel et al. | 310/68 C |

(Continued)

FOREIGN PATENT DOCUMENTS

| JP | A-53-28201 | 3/1978 |
| JP | U-62-202067 | 12/1987 |

(Continued)

OTHER PUBLICATIONS

Japanese Office Action mailed Dec. 21, 2010 issued in Japanese Patent Application No. 2009-144413 (with translation).

(Continued)

*Primary Examiner* — Thanh Lam
(74) *Attorney, Agent, or Firm* — Oliff PLC (57) ABSTRACT

In the stator, a thermistor housed in a tube is arranged to be sandwiched between a coil end and a U-phase bus bar, allowing the thermistor to receive heat from above and below at two faces, that is a face of the U-phase bus bar and a top face of the coil end. Moreover, the thermistor can be placed substantially in close contact with the coil end. Accordingly, the temperature followability by the thermistor can be realized at high accuracy. As a result, there can be provided a stator having a configuration in which temperature followability of high accuracy can be achieved in measuring the temperature of a coil of a stator using a temperature detection element, and that can correspond to further downsizing of a rotating electric machine.

2 Claims, 7 Drawing Sheets

(56) References Cited

U.S. PATENT DOCUMENTS

| | | | |
|---|---|---|---|
| 8,492,943 B2* | 7/2013 | Fargo et al. | 310/68 C |
| 2007/0170792 A1 | 7/2007 | Bott et al. | |
| 2007/0194654 A1* | 8/2007 | Rush et al. | 310/260 |
| 2008/0100184 A1* | 5/2008 | Fargo et al. | 310/68 C |
| 2008/0150376 A1* | 6/2008 | Isoda et al. | 310/52 |
| 2010/0033040 A1* | 2/2010 | Wakita | 310/54 |

FOREIGN PATENT DOCUMENTS

| | | |
|---|---|---|
| JP | A-9-51652 | 2/1997 |
| JP | A-9-312948 | 12/1997 |
| JP | A-2001-52906 | 2/2001 |
| JP | A-2002-272062 | 9/2002 |
| JP | A-2002-300745 | 10/2002 |
| JP | A-2005-16982 | 1/2005 |
| JP | A-2005-130667 | 5/2005 |
| JP | A-2006-340580 | 12/2006 |
| JP | A-2007-82344 | 3/2007 |
| JP | A-2007-507196 | 3/2007 |
| JP | A-2008-29127 | 2/2008 |
| JP | A-2008-131775 | 6/2008 |
| JP | A-2008-178222 | 7/2008 |
| WO | WO 2004/114502 A1 | 12/2004 |
| WO | WO 2006/100839 A1 | 9/2006 |

OTHER PUBLICATIONS

Japanese Office Action mailed May 10, 2011 issued in Japanese Patent Application No. 2009-144413 (with translation).

International Search Report mailed Aug. 31, 2010 issued in International Patent Application No. PCT/JP2010/059677 (with translation).

* cited by examiner

<PRIOR TO ATTACHMENT>

$R_0 < R_2 < R_1$
$2 \times R_0 < L_1 < 2 \times R_1$

FIG.6

<AFTER ATTACHMENT>

FIG.7

FIG.8 <PRIOR TO ATTACHMENT>

$2 \times R_0 < L < 2 \times R_1$

STATOR

TECHNICAL FIELD

The present invention relates to a stator employed in a rotating electric machine such as a motor and generator.

BACKGROUND ART

In a rotating electric machine, controlling the temperature of the coil in the stator is an important factor. For controlling the coil temperature in the stator, a thermistor is employed as a temperature detection element, In order to positionally fix the thermistor with respect to the stator, the rotating electric machine disclosed in Japanese Patent Laying-Open No. 09-312948 (Patent Document 1) has a thermistor arranged on an insulation base provided at a coil end.

In a coil terminal processing apparatus of a motor in Japanese Patent Laying-Open No. 2007-82344 (Patent Document 2), there is disclosed a configuration in which a space for arranging a thermistor is provided at a coil end cover, between a coil end and a substrate directed to wire connection of the coil end, In a rotating electric machine for a vehicle disclosed in Japanese Patent Laying-Open No. 2008-29127 (Patent Document 3), there is disclosed a configuration in which a neutral point insulation case having a sensor holder at the bottom is fixed to the coil end using a band.

CITATION LIST

Patent Documents

Patent Document 1: Japanese Patent Laying-Open No. 09-312948
Patent Document 2: Japanese Patent Laying-Open No. 2007-82344
Patent Document 3: Japanese Patent Laying-Open No. 2008-29127

SUMMARY OF INVENTION

Technical Problem

In recent years, restriction is placed on the space for installing various components in association with further downsizing of a rotating electric machine. As a result, it has become difficult to ensure the space for installing a thermistor and a holder member for the thermistor. Although a possible approach is to install the thermistor at the side face of the coil end that affords room relatively, increase in the coil temperature cannot be measured accurately at the side face of the coil end, leading to another problem of temperature followability in the temperature measurement by the thermistor.

The present invention is directed to solving the problem set forth above. An object of the present invention is to provide a stator having a configuration that allows temperature followability of high accuracy in measuring the temperature of a coil of a stator by a temperature detection element, and that can correspond to further downsizing of a rotating electric machine.

Solution to Problem

The stator of the present invention is configured by arranging a plurality of stator cores in an annular manner, each stator core having a stator coil wound around a stator tooth. The stator includes a bus bar provided above the coil end of the stator coil, connecting stator cores of the same phase, and a temperature detection element for detecting the temperature of the stator.

The temperature detection element is arranged so as to be sandwiched between the coil end and the bus bar. The bus bar has a structure for holding the temperature detection element.

A stator according to another embodiment of the present invention is configured by arranging a plurality of stator cores in an annular manner, each stator core having a stator coil wound around a stator tooth. The stator includes a neutral point terminal provided above the coil end of the stator coil, at each phase of the stator coil, a neutral point connection bar connecting the neutral point terminals, and a temperature detection element for detecting the temperature of the stator.

The temperature detection element is arranged so as to be sandwiched between the coil end and the neutral point connection bar. The neutral point terminal has a structure for holding the temperature detection element.

A stator according to another embodiment of the present invention is configured by arranging a plurality of stator cores in an annular manner, each stator core having a stator coil wound around a stator tooth. The stator includes an input terminal provided above the coil end of the stator coil, at each phase of the stator coil, and a temperature detection element for detecting the temperature of the stator.

The temperature detection element is arranged so as to be sandwiched between the coil end and the input terminal. The input terminal has a structure for holding the temperature detection element.

Advantageous Effects of Invention

The stator according to the present invention allows measurement of the temperature at the top face of the coil end. Therefore, there can be provided a stator having a configuration in which temperature followability of high accuracy can be achieved, and that can correspond to further downsizing of the rotating electric machine.

DESCRIPTION OF EMBODIMENTS

A stator according to respective embodiments of the present invention will be described hereinafter with reference to the drawings. In the embodiments set forth below, the scope of the present invention is not limited to the cited number, amount, and the like, unless stated otherwise. The same or corresponding elements have the same reference characters allotted, and a duplicating description may not be repeated.

First Embodiment (Appearance of Stator 100)

Figure 1:
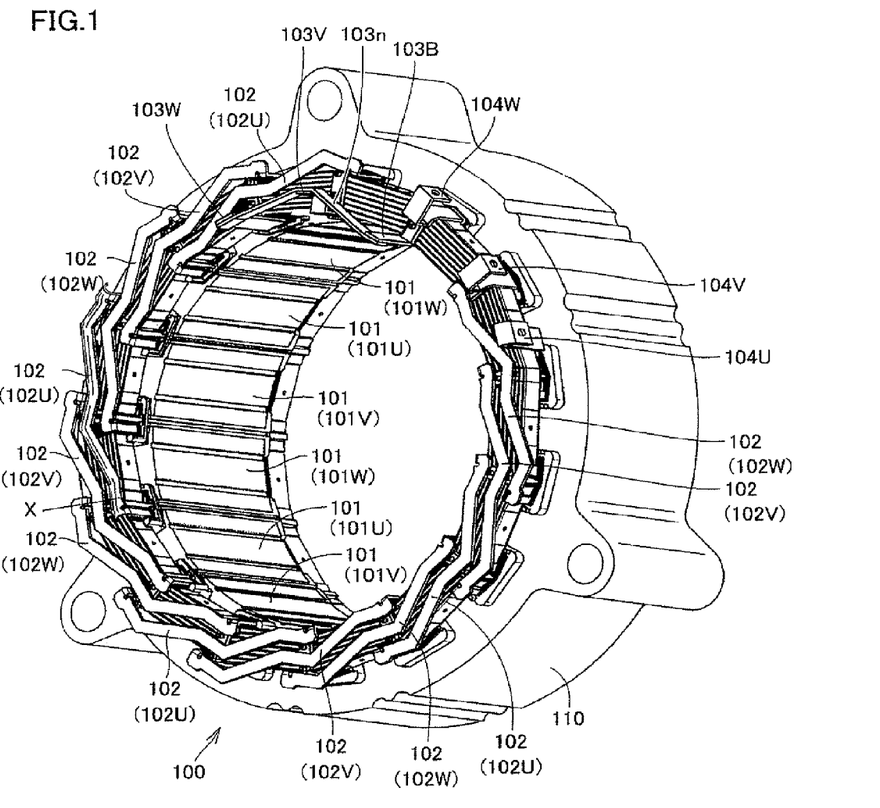
FIG. 1 is an overall perspective view of an appearance of a stator according to a first embodiment.
Figure 2:
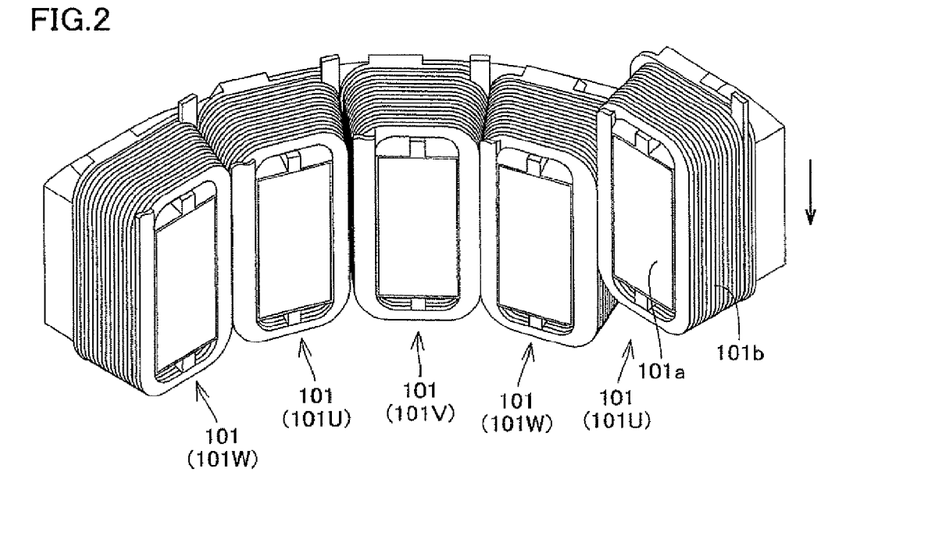
FIG. 2 is a partial enlarged perspective view of a configuration of a stator coil employed in the stator of the first embodiment.

Referring to FIGS. 1 and 2, the appearance of a stator 100 employed in a rotating electric machine such as a motor or generator will be described according to the present embodiment. Stator 100 has an annular structure in which a plurality of stator cores 101 are arranged annularly.

Stator core 101 includes a U-phase stator core 101U constituting a U-phase coil, a V-phase stator core 101V constituting a V-phase coil, and a W-phase stator core 101W constituting a W-phase coil. Each stator core 101 has, as shown in FIG. 2, a stator coil 101b wound around a stator tooth 101a.

Above a coil end 101e of each stator core 101, a bus bar 102 is provided, connecting the coils of stator cores of the same phase. Specifically, a U-phase bus bar 102U connecting U-phase stator cores 101U constituting the U-phase coil, a V-phase bus bar 102V connecting V-phase stator cores 101V constituting the V-phase coil, and a W-phase bus bar 102W connecting W-phase stator cores 101W constituting the W-phase coil are provided in plurality.

At a predetermined position of coil end 101e in stator core 101, a U-phase neutral point terminal 103U, a V-phase neutral point terminal 103V, and a W-phase neutral point terminal 103W provided at respective phases (U-phase, V-phase, W-phase) of stator coil 101 are drawn out above coil end 101e. Further, a neutral point connection bar 103B connecting U-phase neutral point terminal 103U, V-phase neutral point terminal 103V, and W-phase neutral point terminal 103W is provided. The configuration of U-phase neutral point terminal 103U, V-phase neutral point terminal 103V, and W-phase neutral point terminal 103W will be described in detail in the second embodiment.

At a predetermined position of coil end 101e in stator core 101, a U-phase input terminal 104U, a V-phase input terminal 104V, and a W-phase input terminal 104W provided at respective phases (U-phase, V-phase, W-phase) of stator coil 101 are drawn out above coil end 101e. The configuration of U-phase input terminal 104U, V-phase input terminal 104V, and input terminal will be described in detail in the third embodiment.

Stator 100 of the above-described configuration has, as the eventual structure, the bus bar, the neutral point terminal and the like (excluding U-phase input terminals 104U, 104V and 104W) covered with a resin mold 110. For the sake of simplification of the internal structure, the bus bar, the neutral point terminal and the like are depicted in a state not covered with resin mold 110 in FIG. 1.

Figure 3:
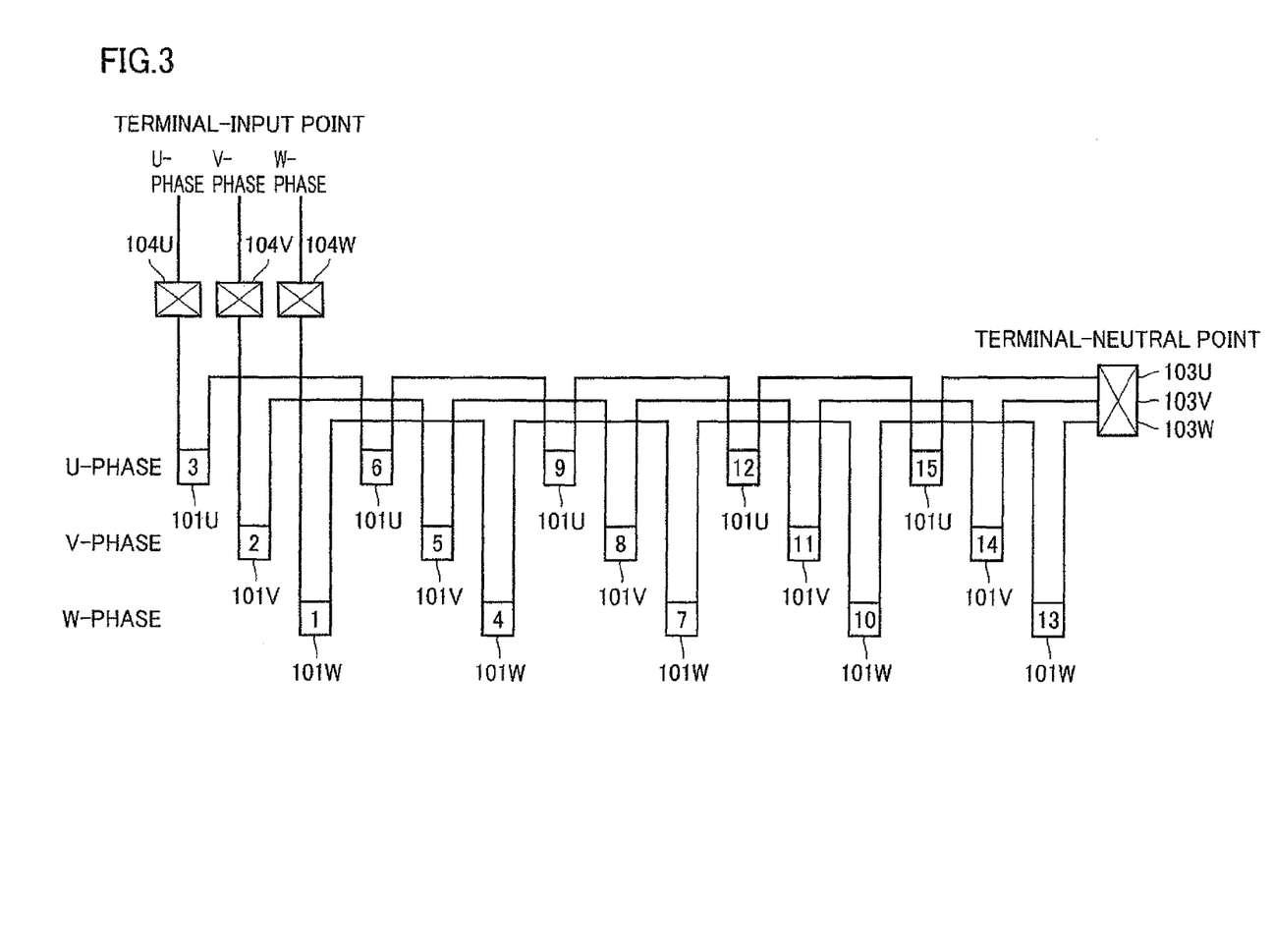
FIG. 3 represents the coil connection of the stator according to the first embodiment.

FIG. 3 represents the wire connection of stator 100 of the above-described structure. In the present embodiment, fifteen stator cores 101 are employed. As U-phase stator cores 101U constituting the U-phase coil, stator cores 101 of No. 3, No. 6, No. 9, No. 12 and No. 15 are connected in series. The coil wire has one end connected to U-phase input terminal 104U and the other end connected to U-phase neutral point terminal 103U.

As V-phase stator cores 101V constituting the V-phase coil, stator cores 101 of No. 2, No. 5, No. 8, No. 11 and No. 14 are connected in series. The coil wire has one end connected to V-phase input terminal 104V, and the other end connected to U-phase neutral point terminal 103V.

As W-phase stator cores 101W constituting the W-phase coil, stator cores 101 of No. 1, No. 4, No. 7, No. 10 and No. 13 are connected in series. The coil wire has one end connected to W-phase input terminal 104W, and the other end connected to U-phase neutral point terminal 103W.

(Fixation Structure of Temperature Detection Element)

Figure 4:
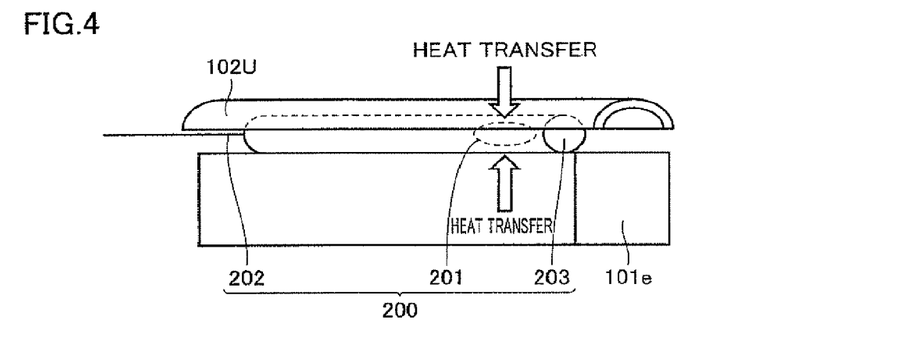
FIG. 4 schematically represents a fixation structure of a temperature detection element according to the first embodiment.
Figure 5:
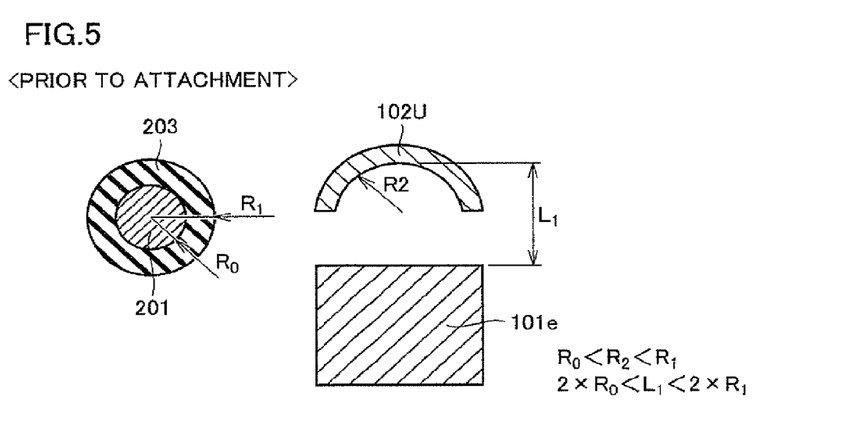
FIG. 5 is a schematic sectional view representing a state prior to attachment of the temperature detection element according to the first embodiment.
Figure 6:
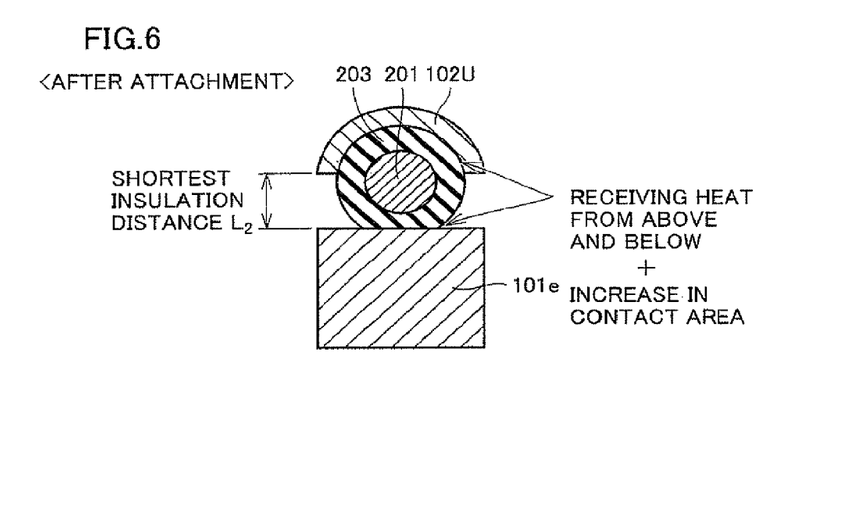
FIG. 6 is a schematic sectional view representing a state after attachment of the temperature detection element according to the first embodiment.

Referring to FIGS. 4-6, a fixation configuration of a temperature detection element 200 for detecting the temperature of stator 100 in the present embodiment will be described. By way of example, the present embodiment will be described based on the case where U-phase bus bar 102U, indicated by X in FIG. 1, is used. The bus bar is not limited to U-phase bus bar 102U, and any other bus bar may be used.

Referring to FIG. 4, temperature detection element 200 of the present embodiment includes a thermistor 201 of a small size. This thermistor 201 is housed in a resin tube 203 in proximity to the leading end. A signal line 202 connected to thermistor 201 is led out from the rear side of tube 203. The size of thermistor 201 is approximately 1 mm to 3 mm in width, and approximately 3 mm to 6 mm in length.

Thermistor 201 housed in tube 203 is arranged so as to be sandwiched between coil end 101e and U-phase bus bar 102U. Although other bus bars have a cross section of a plate, U-phase bus bar 102U for holding thermistor 201 has an arc-shaped cross section with the recess facing thermistor 201.

As shown in FIG. 5, the dimensional relationship of expression (1) and expression (2) set forth below is established in the present embodiment.

$$R_0 < R_2 < R_1 \tag{1}$$

$$2 \times R_0 < L_1 < 2 \times R_1 \tag{2}$$

where $R_0$ is the radius of the cross section (largest region) of thermistor 201, $R_1$ is the radius of the cross section of tube 203, $R_2$ is the radius of curvature of the inner face side of U-phase bus bar 102U, and $L_1$ is the distance between the inner face of U-phase bus bar 102U and the top end face of coil end 101e.

By establishing the dimensional relationship of expression (1) and expression (2), thermistor 201 can be pressed sufficiently against coil end 101e by U-phase bus bar 102U. It is to be noted that a clearance $L_2$ is provided to avoid interference between U-phase bus bar 102U and coil end 101e.

(Function/Effect)

In stator 100 of the present embodiment, thermistor 201 can receive heat from above and below at two faces, i.e. from U-phase bus bar 102U and the top face of coil end 101e, as shown in FIGS. 4 and 6. Thermistor 201 can be placed substantially in close contact with coil end 101e. Accordingly, the temperature followability by thermistor 201 can be realized at high accuracy.

The region between U-phase bus bar 102U and coil end 101e is conventionally not used. Therefore, an additional region to install temperature detection element 200 is not required. The requirement of further downsizing the rotating electric machine can be satisfied.

The location where temperature detection element 200 is situated is preferably closer towards the inner circumference side of stator 100. This is because the heat generated at stator 100 moves from the inner side towards the outer side. Accordingly, the stator has a temperature distribution exhibiting higher temperature at the inner side than at the outer circumference side of stator 100.

It is to be also noted that the amount of the heat absorbing member (thermal mass: the amount of mold resin, magnetic steel sheet is lower at the inner side than at the outer circumference side of stator 100. This means that heat will not be readily derived of by these members, allowing more precise detection of the actual temperature of the coil in the stator. Moreover, the inner side is more immune to the circulating ATF (coolant) directed to cooling the stator.

According to stator 100 of the present embodiment, the temperature of the inner side can be measured at the top face of coil end 101e. Therefore, the temperature extremely close to the actual temperature of the coil can be measured, and temperature followability of high accuracy can be achieved. A stator having a configuration capable of corresponding to further downsizing of the rotating electric machine can be provided.

Since temperature detection element 200 is firmly held by U-phase bus bar 102U even during the mold shaping process of stator 100, temperature detection element 200 will not move, and the workability during the mold shaping process will not be degraded. Moreover, the number of manufacturing steps will not be increased.

Second Embodiment

A stator according to the present embodiment will be described hereinafter with reference to FIGS. 7-9. The basic configuration of the stator is similar to that of the first embodiment set forth above, and the difference lies in the fixation structure of temperature detection element 200. Therefore, in the following, only the fixation structure of the temperature detection element of the present embodiment will be described in detail.

(Fixation Structure of Temperature Detection Element)

The fixation structure of temperature detection element 200 to detect the temperature of stator 100 according to the present embodiment will be described. In the present embodiment, fixing temperature detection element 200 using U-phase neutral point terminal 103U, V-phase neutral point terminal 103V and W-phase neutral point terminal 103W provided for respective phases (U-phase, V-phase and W-phase) of stator coil 101, and neutral point connection bar 103B will be described. The embodiment of temperature detection element 200 is similar to that of the first embodiment set forth above. Therefore, any duplicating description will not be repeated.

Figure 7:
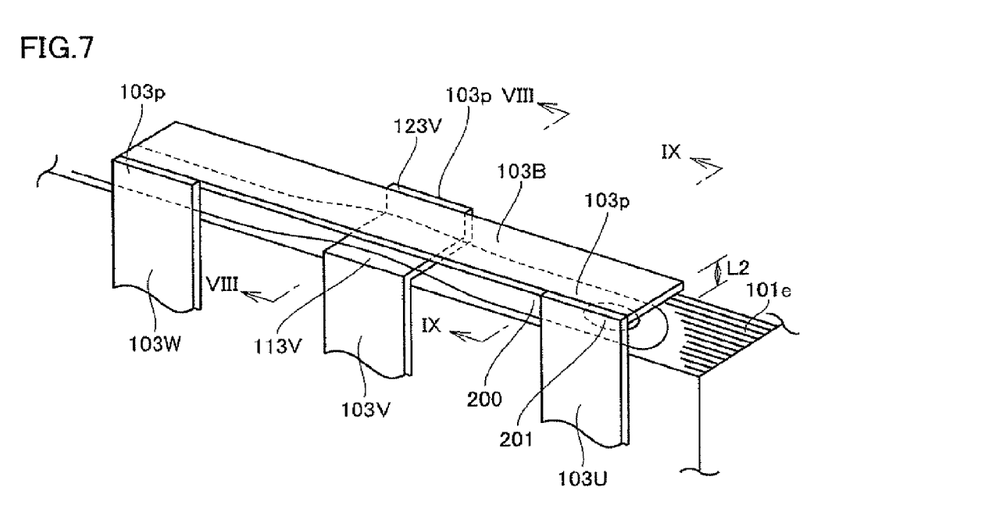
FIG. 7 is a schematic diagram of a fixation structure of a temperature detection element according to a second embodiment.

As shown in FIG. 7, U-phase neutral point terminal 103U and W-phase neutral point terminal 103W are provided extending straight upwards (the direction of the rotation axis of rotating electric machine) at an inner side position of stator core 101. V-phase neutral point terminal 103V located between U-phase neutral point terminal 103U and W-phase neutral point terminal 103W includes a parallel portion 113V that is a portion of the neutral point terminal bent outwards so as to be parallel with the top face of coil end 101e, and an upright portion 123V extending upwards from the leading end of parallel portion 113V, constituting a structure for holding temperature detection element 200.

Neutral point connection bar 103B has a flat plate shape, and is attached to be connected to the top end portions of U-phase neutral point terminal 103U, V-phase neutral point terminal 103V, and W-phase neutral point terminal 103W at connecting portion 103p such that the flat face in the longitudinal direction is parallel to the top face of coil end 101e. A predetermined dimension is selected such that the distance (L2) between the bottom face of neutral point connection bar 103B and the top face of coil end 101e attains the shortest insulation distance.

Temperature detection element 200 is arranged sandwiched between coil end 101e and neutral point connection bar 103B, passing through the gap provided between the lower end of neutral point connection bar 103B and the top face of coil end 101e, as well as over the top face of parallel portion 113V.

Figure 8:
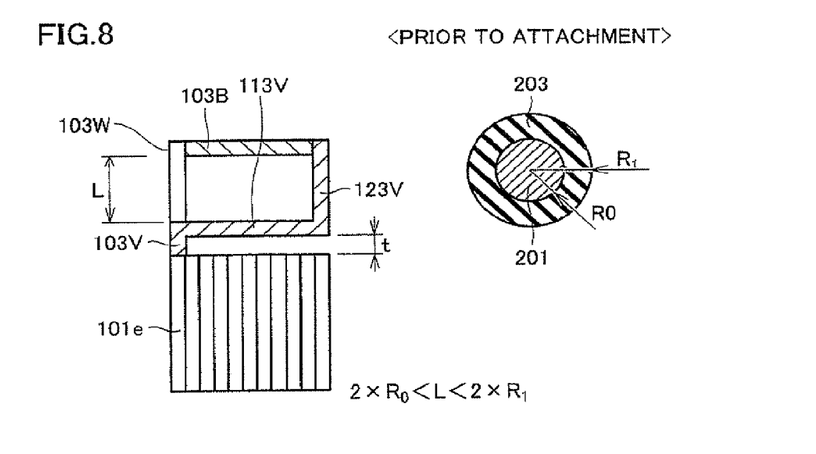
FIG. 8 is a schematic sectional view in the direction of arrow VIII-VIII in FIG. 7, representing a state prior to attachment of the temperature detection element according to the second embodiment.
Figure 9:
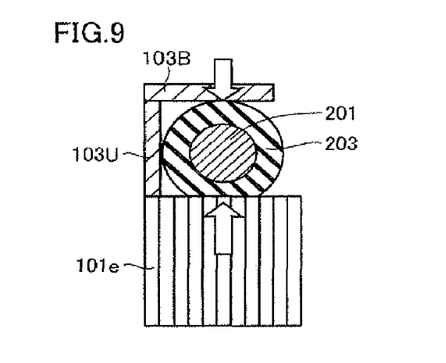
FIG. 9 is a schematic sectional view in the direction of arrow IX-IX in FIG. 7, representing a state after attachment of the temperature detection element according to the second embodiment.

FIG. 8 is a sectional view representing the state prior to temperature detection element 200 being fixed. The dimensional relationship of expression (3) set forth below is established in the present embodiment, where L is the distance between the bottom face of neutral point connection bar 103B and the top face of parallel portion 113V, $R_0$ is the radius of the cross section (largest region) of thermistor 201, and $R_1$ is the radius of the cross section of tube 203. The bottom face of parallel portion 113V and the top face of coil end 101e are set to attain the shortest insulation distance (t: approximately 1 mm to 2 mm).

$$2 \times R_0 < L < 2 \times R_1 \tag{3}$$

Accordingly, by arranging temperature detection element 200 so as to pass through the gap between the lower end of neutral point connection bar 103B and the top face of coil end 101e, and also over the top face of parallel portion 113V, thermistor 201 can be pressed against coil end 101e by the bottom face of neutral point connection bar 103B.

(Function/Effect)

In stator 100 of the present embodiment, thermistor 201 can receive heat from above and below at two faces, i.e. the bottom face of neutral point connection bar 103B and the top face of coil end 101e. Further, thermistor 201 can be placed substantially in close contact with coil end 101e. Accordingly, temperature followability by thermistor 201 can be realized at high accuracy.

Since the region below neutral point connection bar 103B is not conventionally used, an additional region for installing temperature detection element 200 is not required. The requirement of further downsizing the rotating electric machine can be met. Preferably, temperature detection element 200 is situated closer towards the inner circumference side of the stator, by the same reason set forth above in the first embodiment.

A similar functional effect can be achieved by employing a configuration in which U-phase neutral point terminal 103U and W-phase neutral point terminal 103W located at respective sides are bent outwards to have a parallel portion and upright portion, or a configuration in which V-phase neutral point terminal 103V located at the middle extends straight upwards, differing from the present embodiment.

Figure 10:
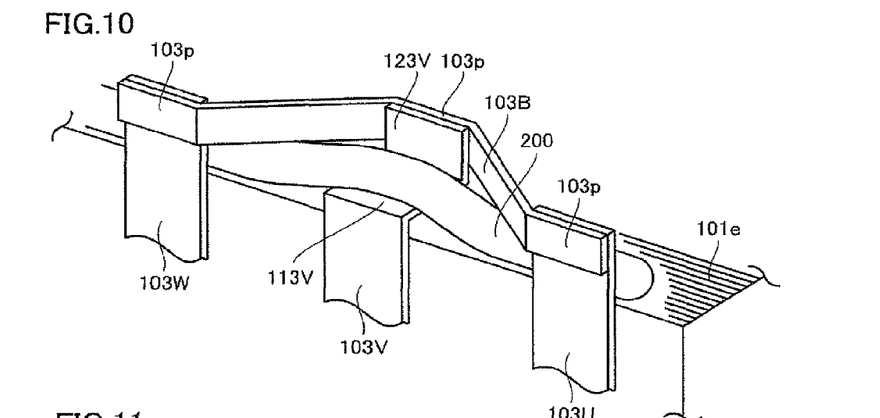
FIG. 10 is a schematic diagram representing another fixation structure of a temperature detection element according to the second embodiment.
Figure 11:
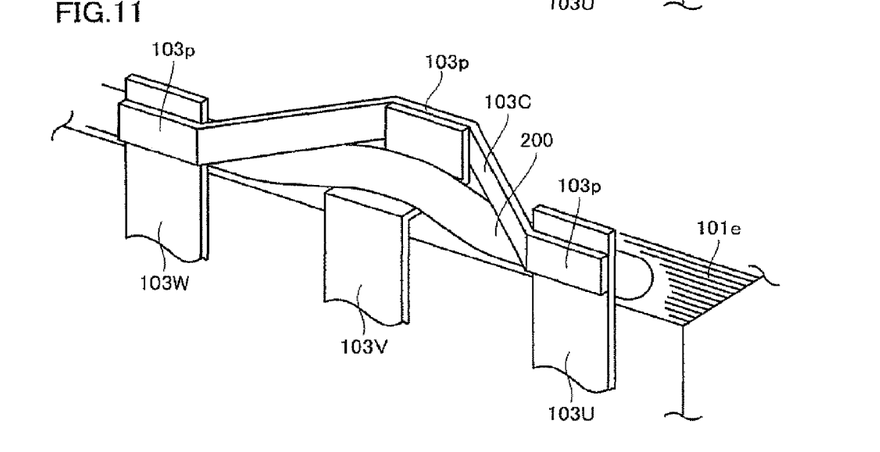
FIG. 11 is a schematic diagram representing still another fixation structure of a temperature detection element according to the second embodiment.

Another structure of neutral point connection bar 103B is shown in FIG. 10. This neutral point connection bar 103C has a flat plate shape, and is attached to be connected to the top end portions of U-phase neutral point terminal 103U, V-phase neutral point terminal 103V and W-phase neutral point terminal 103W at connecting portion 103p under the state where the flat face in the longitudinal direction of neutral point connection bar 103C is upright with respect to the top face of coil end 101e. Similarly, thermistor 201 can be pressed against coil end 101e by the bottom face of neutral point connection bar 103C by employing such a configuration.

In the case where thermistor 201 has to be further pressed against coil end 101e, connecting portion 103p of neutral point connection bar 103C, located between U-phase neutral point terminal 103U and W-phase neutral point terminal 103W, can be lowered down towards coil end 101e.

According to stator 100 of the present embodiment, the temperature of the inner side can be measured at the top face of coil end 101e, Therefore, a temperature extremely close to the actual temperature of the coil can be measured, and temperature followability of high accuracy can be achieved. A stator having a configuration capable of corresponding to further downsizing of the rotating electric machine can be provided.

Since temperature detection element 200 is firmly held by U-phase bus bar 102U even during the mold shaping process of stator 100, temperature detection element 200 will not move, and the workability during the mold shaping process will not be degraded. Moreover, the number of manufacturing steps will not be increased.

Third Embodiment

A stator according to the present embodiment will be described hereinafter with reference to FIGS. 12 and 13. The basic configuration of the stator is similar to that of the first embodiment, and the difference lies in the fixation structure of temperature detection element 200. In the following, only the fixation structure of the temperature detection element according to the present embodiment will be described in detail.

(Fixation Structure of Temperature Detection Element)

The fixation structure of temperature detection element 200 to detect the temperature of stator 100 according to the present embodiment will be described. In the present embodiment, fixing temperature detection element 200 using U-phase input terminal 104U, V-phase input terminal 104V and W-phase input terminal 104W, shown in FIG. 1, will be described. The embodiment of temperature detection element 200 is similar to that of the first embodiment set forth above. Therefore, any duplicating description will not be repeated.

Figure 12:
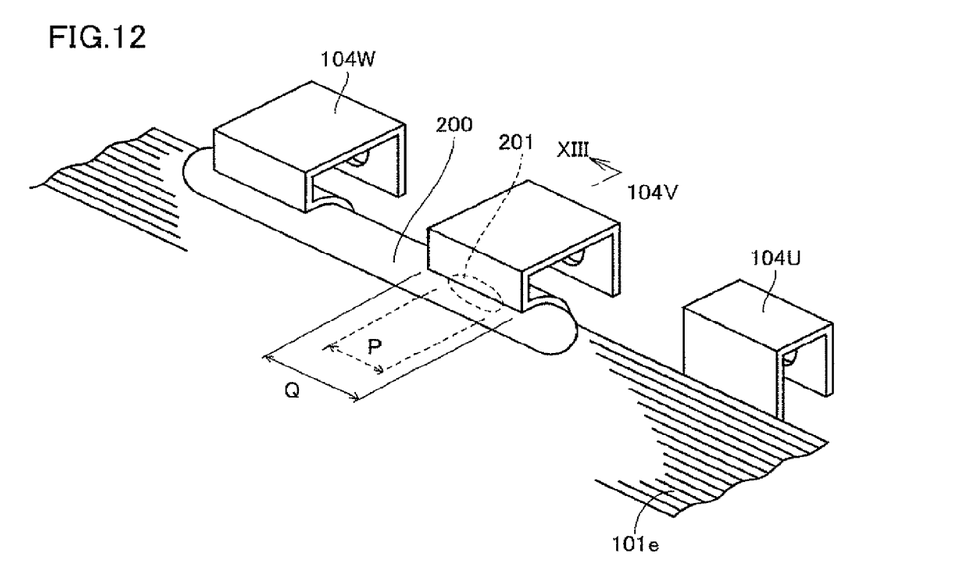
FIG. 12 schematically represents a fixation structure of a temperature detection element according to a third embodiment.

As shown in FIG. 12, U-phase input terminal 104U has substantially an upside down U shape bent outwards at the outer circumference side of stator 100. V-phase input terminal 104V and W-phase input terminal 104W are arranged such that temperature detection element 200 is sandwiched between coil end 101e and V-phase input terminals 104V and 104W. Therefore, V-phase input terminals 104V and 104W have a structure for holding temperature detection element 200.

A specific configuration of V-phase input terminals 104V and 104W will be described hereinafter. Since V-phase input terminal 104V and W-phase input terminal 104W have the same configuration, only the configuration of V-phase input terminal 104V will be described here.

Figure 13:
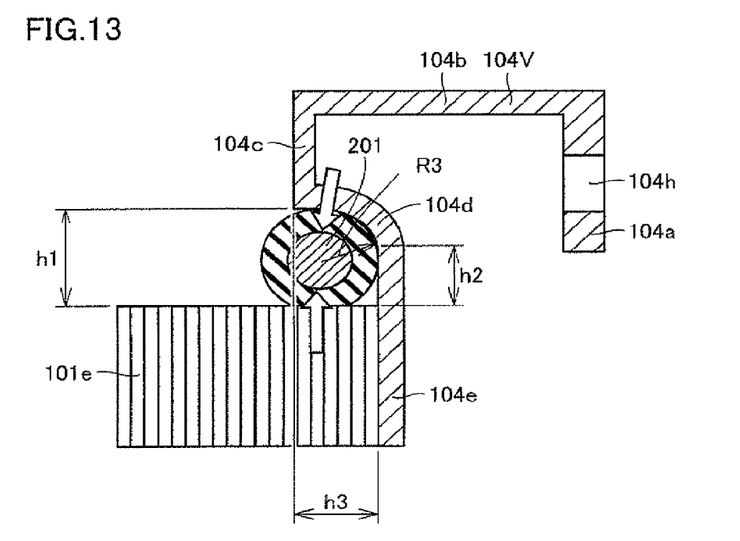
FIG. 13 is a schematic sectional view in the direction of arrow XIII in FIG. 12, representing a state after attachment of the temperature detection element according to the third embodiment.

Referring to FIG. 13, V-phase input terminal 104V includes a base portion 104e fixed to coil end 101e and extending upwards, a dome portion 104d rounded inward from base portion 104e with a predetermined radius of curvature, an upright portion 104c extending upwards from the leading end of dome portion 104d, a parallel portion 104b extending outwards from the upright portion, and a terminal portion 104a extending downwards from the leading end of parallel portion 104b. Terminal portion 104a is provided with a terminal hole 104h.

Let the radius of the cross section (largest region) of thermistor 201 be $R_0$, the radius of the cross section of tube 203 be R1 (refer to FIG. 5), the distance from the leading end of dome portion 104d to the top face of coil end 101e (insulation distance) be $h_1$, the projecting length of base portion 104e from the top face of coil end 101e be $h_2$, the distance from the inner face of base portion 104e to the inner face of upright portion 104c be $h_3$, and the radius of curvature of dome portion 104d at the inner side be $R_3$. In the present embodiment, the dimensional relationship of expression (4) to expression (7) set forth below is established. Furthermore, the width Q of V-phase input terminal 104V (refer to FIG. 12) is preferably longer than the length P of thermistor 201, so that thermistor 201 is arranged to be situated within the width of V-phase input terminal 104V.

$$R_3 < R_1 \tag{4}$$

$$R_0 < h_1 < R_1 \tag{5}$$

$$2 \times R_0 < h_2 < 2 \times R_1 \tag{6}$$

$$h_3 < 2 \times R_1 \tag{7}$$

Accordingly, thermistor 201 can be pressed against coil end 101e at the gap between V-phase and W-phase input terminals 104V and 104W and the top face of coil end 101e, as shown in FIGS. 12 and 13.

(Function/Effect)

In stator 100 of the present embodiment, thermistor 201 can receive heat from above and below at two faces, i.e. the bottom face of dome portion 104d of V-phase input terminal 104V and the top face of coil end 101e, as shown in FIG. 13. Accordingly, temperature followability by thermistor 201 can be realized at high accuracy.

Since the region below V-phase input terminal 104V and W-phase input terminal 104W is not conventionally used, an additional region for installing temperature detection element 200 is not required. The requirement of further downsizing the rotating electric machine can be met.

According to stator 100 of the present embodiment, the temperature at the top face of coil end 101e can be measured. Therefore, a temperature extremely close to the actual temperature of the coil can be measured, and temperature followability of high accuracy can be achieved. A stator having a configuration capable of corresponding to further downsizing of the rotating electric machine can be provided.

Since temperature detection element 200 is firmly held by V-phase input terminal 104V and W-phase input terminal 104W even during the mold shaping process of stator 100, temperature detection element 200 will not move, and the workability during the mold shaping process will not be degraded. Moreover, the number of manufacturing steps will not be increased.

Although the present embodiment has described based on the case where temperature detection element 200 is fixed using two input terminals among the three input terminals, i.e. a U-phase input terminal 104U, a V-phase input terminal 104V, and a W-phase input terminal 104W, a configuration in which temperature detection element 200 is fixed using one input terminal, two input terminals, or three input terminals selected from the three input terminals may be employed.

Although the embodiments have been described corresponding to the case where the present invention is applied to a 3-phase rotating electric, the present invention is not limited thereto. Application to a stator of a rotating electric machine having a similar configuration is allowed.

It should be understood that the embodiments disclosed herein are illustrative and non-restrictive in every respect. The scope of the present invention is defined by the terms of the claims, rather than the description of the embodiments set forth above, and is intended to include any modifications within the scope and meaning equivalent to the terms of the claims.

REFERENCE SIGNS LIST 100 stator; 101 stator core; 101U U-phase stator core; 101V V-phase stator core; 101W W-phase stator core; 101a stator tooth; 101b stator coil; 101e coil end; 102U U-phase bus bar; 102V V-phase bus bar; 102W W-phase bus bar; 103U U-phase neutral point terminal; 103V V-phase neutral point terminal; 103W W-phase neutral point terminal; 103B, 103C neutral point connection bar; 104a terminal portion; 104b parallel portion; 104c upright portion; 104d dome portion; 104e base portion; 104h terminal hole; 104U U-phase input terminal; 104V V-phase input terminal; 104W W-phase input terminal; 113V parallel portion; 123V upright portion; 200 temperature detection element; 201 thermistor; 202 signal line

The invention claimed is:

1. A stator configured by arranging a plurality of stator cores in an annular manner, each stator core having a stator coil wound around a stator tooth, said stator comprising:
    a neutral point terminal provided above a coil end of said stator core, at each phase of said stator coil,
    a neutral point connection bar connecting said neutral point terminals, and
    a temperature detection element for detecting a temperature of said stator,
    said temperature detection element arranged so as to be sandwiched between said coil end and said neutral point connection bar,
    said neutral point terminal having a structure for holding said temperature detection element,
    said neutral point terminal including a parallel portion that is a portion of the neutral point terminal bent outwards so as to be parallel to a top face of said coil end, and
    said temperature detection element being arranged so as to be sandwiched between said coil end and said neutral point connection bar, and pass over a top face of said parallel portion.

2. The stator according to claim 1, wherein
    said temperature detection element comprises a thermistor and a tube for housing said thermistor, and
    a dimensional relationship of expression (3) set forth below is established:

$$2 \times R_0 < L < 2 \times R_1 \tag{3}$$

where $R_0$ is a radius of a cross section of said thermistor, $R_1$ is the radius of a cross section of said tube, and L is a distance between a bottom face of said neutral point connection bar and a top face of said parallel portion.

* * * * *